Nov. 3, 1936.  M. FARBER  2,059,938

MEAT SMOKING DEVICE

Filed Jan. 2, 1936

Max Farber

Patented Nov. 3, 1936

2,059,938

UNITED STATES PATENT OFFICE 2,059,938

MEAT SMOKING DEVICE

Max Farber, New York, N. Y.

Application January 2, 1936, Serial No. 57,274

4 Claims. (Cl. 100—57)

This invention relates to a compressor, primarily adapted for use in the smoking of pastrami, ham and other spiced and smoked meats.

It is generally aimed to provide a novel construction wherein a slow and steady pressure on the meat through the action of the smoke, is maintained over the entire outer surface thereof in an automatic manner.

The more specific objects and advantages will become apparent from a consideration of the description following taken in connection with accompanying drawing illustrating an operative embodiment.

Drawing:—

Figure 1:
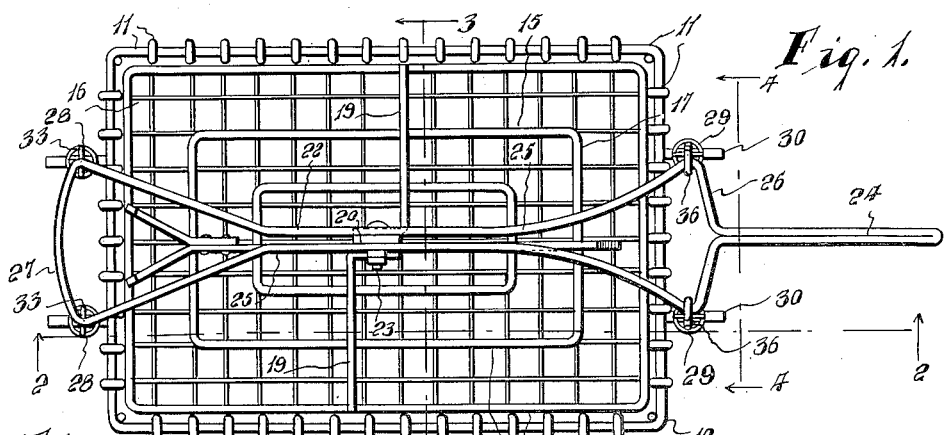
Figures 2, 4:
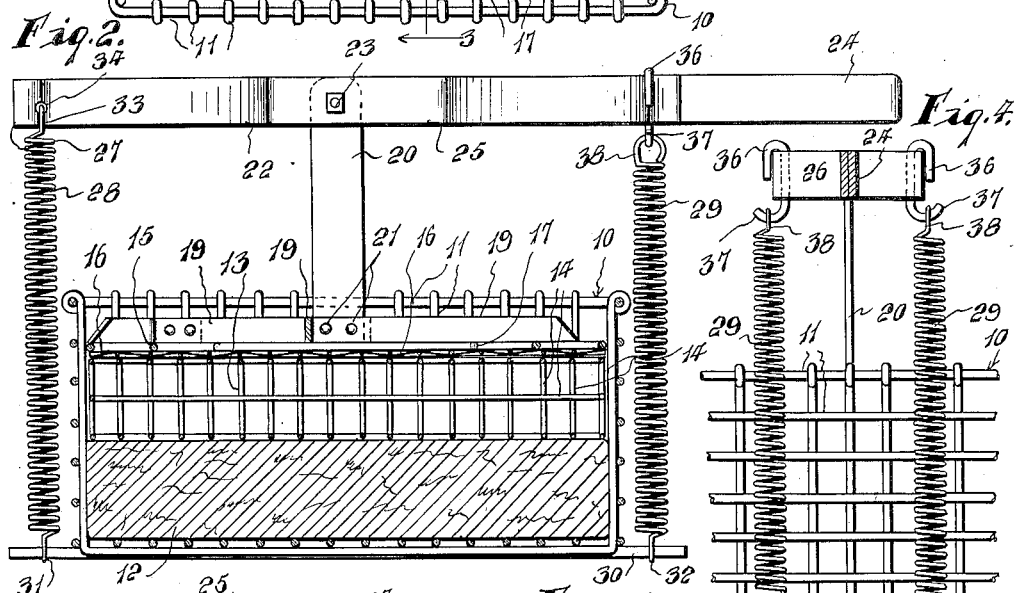
Figures 3, 5:
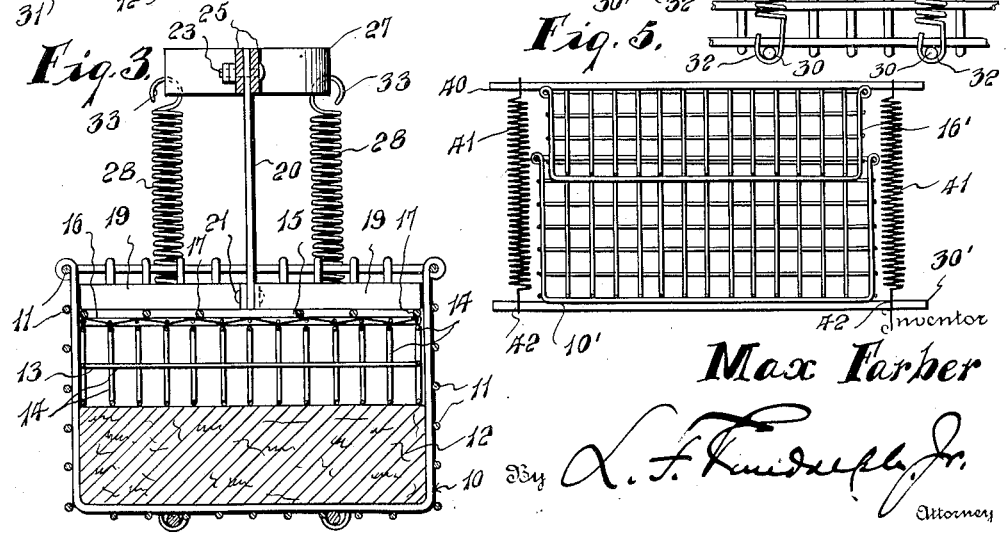

Figure 1 is a plan view of the compressor,

Figure 2 is a longitudinal sectional view thereof, taken on the line 2—2 of Figure 1, Figure 3 is a cross-sectional view taken on the line 3—3 of Figure 1, Figure 4 is a cross-sectional view taken on the line 4—4 of Figure 1, and Figure 5 is a cross-sectional view taken through a modified form.

Referring specifically to the drawing, wherein like reference characters designate like or similar parts, 10 designates a basket, box or other suitable receptacle, of any desired shape. It is usually rectangular and open at the top, and made reticulate, that is of crossed wires 11, connected together by soldering, or in any other desired manner so as to leave spaces therebetween as shown. The meat to be smoked and compressed is suggested at 12, and for example may be pastrami, ham and other spiced and smoked meats. When the meat is relatively thin as shown in the drawing, a cushioning body 13, is arranged in contact with the upper section thereof. Such body 13, is independent of the basket 11, so that it may be removed and replaced at will and it is preferably rectangular in shape and made up of the wires 14, in crossed relation, soldered or welded or otherwise secured together.

Above the cushioning and filler frame 13, a follower 15, is provided. This follower 15 may directly engage the upper surface of the meat or frame 13. When the basket is sufficiently full, the meat is directly engaged by the follower 15 and hence the frame 13 is used only when the meat 12, is relatively thin.

The follower 15 has a relatively flat wire body 16, reinforced by wire frame 17. Metallic bars 19, are disposed transversely of the frame 17 and welded or soldered thereto and a stem riveted at the junction thereof as at 21.

To the upper end of the stem 20, a lever 22 is pivoted as by means of a bolt 23. Such lever 22, may consist of an endless strap having portions doubled upon themselves to provide a handle as at 24, to provide relatively close base arms 25, between which the stem 20 is disposed, and open loop portions 26 and 27.

A pair of contractile coil springs 28, is disposed at one end of the device while a pair of similar springs 29, is disposed at the other end of the device. Across the bottom of the basket 10, a pair of parallel rods 30, is disposed, preferably being separate from the basket although capable of being soldered or welded thereto if desired. Said springs 28 and 29 at their lower ends have added hooks 31 and 32 respectively, detachedly engaged at the ends of said rods 30. Springs 28, have hooks 33, at their upper ends which are detachedly engaged in openings 34, of the loops 27 at the widest portion thereof. At the widest portions of the loops 26, hooks 36, are suspended loosely and they have lateral portions 37, detachedly engaged by eyelets 38, at the upper ends of the springs 29.

Normally, the springs 29, at the eyelets 38, are disengaged from the hook portions 37, and hence the follower or compressor 15, may be completely removed from the basket, by the yielding of the springs 28, permitting such action. Also, the cushion-frame 13 may be removed. After the meat is applied at 12, the follower may be restored to the basket with or without the cushion-frame 13, after which the eyelets 38 of spring 29 are engaged with the hook portions 37. As a result, the meat is placed under pressure since the follower or compressor 15, is in constant compressing engagement with the meat through the action of the four springs 28, and 29. In this condition, the meat is adapted to be smoked or treated, the reticulate construction of the parts enabling the smoke to reach the entire outer surface of the meat and the springs serving to automatically take up any slack due to shrinkage of the meat, the springs effecting a slow and steady pressure on the meat with any shrinkage or change of condition automatically being taken up or remedied.

It will be understood that various changes may be resorted to within the spirit and scope of the invention. For instance the form shown in Figure 5, may be used. It consists of a basket 10' identical with that at 10, and a follower or compressor 16', identical in construction to the basket 10' although slightly smaller and adapted to telescope within the latter to directly engage and compress meat which may be contained in the basket 10'. Across the bottom of the basket 10', are rods 30' identical with those at 30, while the rods 40, rigidly secured to or removable from the follower 16' are disposed at the top of the latter. Contractile springs 41, functioning like those at 28 and 29, have hooks 42 at each end thereof detachedly engaging the rods 30' and 40. Thus the meat is treated in the same manner as in the preceding form and the same results are attained.

It is understood that the meat is first cured or spiced, or both and it is then placed in the automatic meat compressor, where it could be smoked or boiled as desired.

I claim as my invention:—

1. A device of the class described comprising an open-work basket, an open-work follower operable therein, a lever pivoted to the follower, and contractile spring means connected to the basket and to said lever on opposite sides of the fulcrum of said lever.

2. A device of the class described comprising an open-work basket, an open-work follower operable therein, a lever pivoted to the follower, and a pair of contractile springs connected to the basket and to said lever on each of opposite sides of the fulcrum of said lever, said basket having rods at the bottom thereof extending beyond opposite ends and to which the springs are connected in spaced apart relation.

3. A device of the class described comprising an open-work basket, an open-work follower operable therein, a lever pivoted to the follower, and contractile spring means connected to the basket and to said lever on opposite sides of the fulcrum of said lever, bar members reinforcing said follower, and a stem connected to the bar members, said lever being pivoted directly to the bar members.

4. A compressor of the class described comprising a basket, a follower therein to engage the meat, and means subjecting the follower to a draw-in action to move the same towards the bottom of the basket, comprising members projecting exteriorly of the basket beyond the same at top and bottom, and a pair of contractile springs at each end of the device connected to said members, said top projecting member having horizontal loops providing laterally spaced portions adjacent each end of the device, means connecting a pair of the springs to said portions of one of the loops, and means detachedly connecting the remainder of the springs to said portions of the other loop.

MAX FARBER.